June 29, 1954
O. H. SCHMITT ET AL
AMPLIFIER
Original Filed May 25, 1948
2,682,607
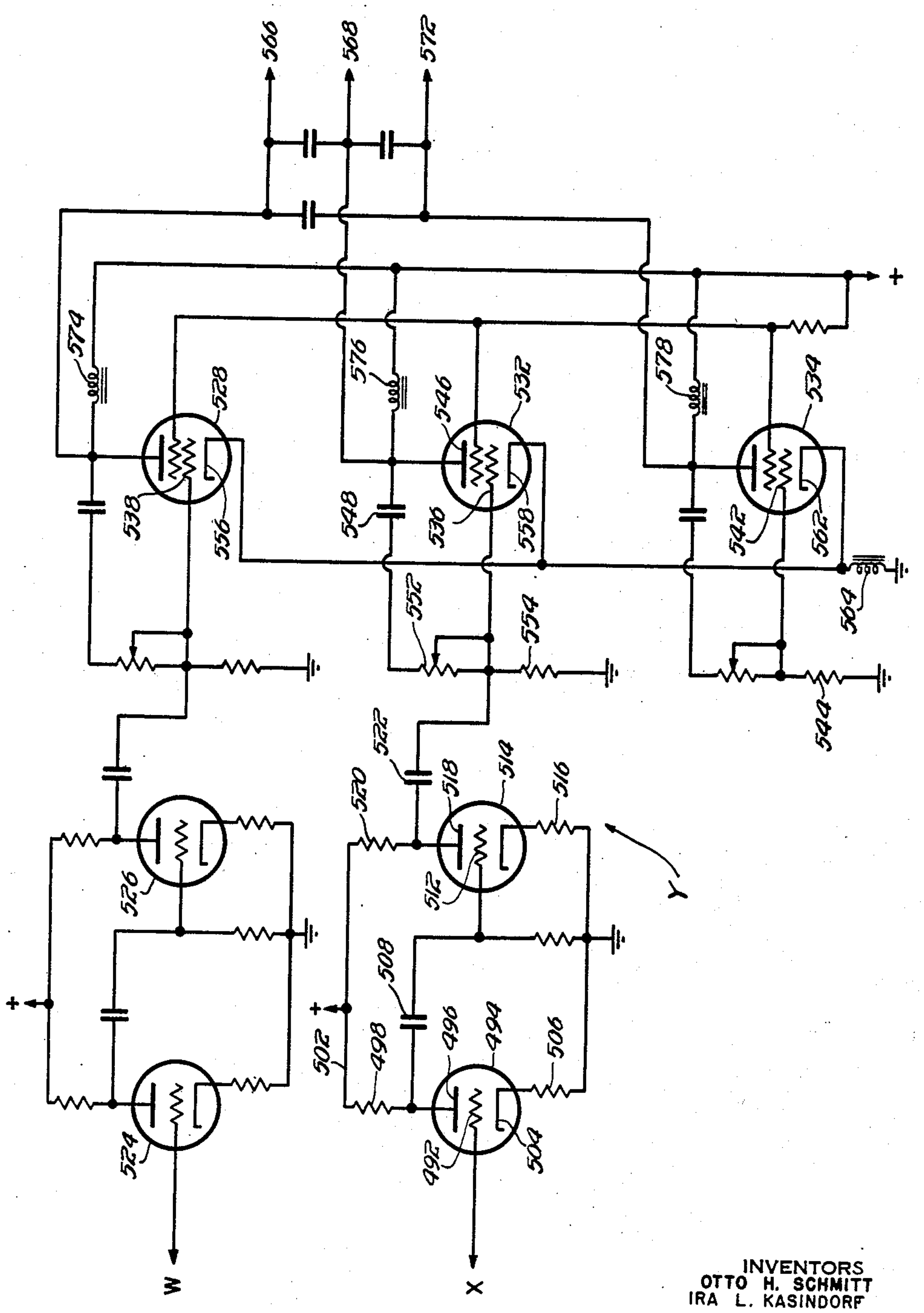
INVENTORS
OTTO H. SCHMITT
IRA L. KASINDORF
BY Curtis, Morris + Safford
ATTORNEYS Patented June 29, 1954

2,682,607

UNITED STATES PATENT OFFICE 2,682,607

AMPLIFIER

Otto H. Schmitt, Minneapolis, Minn., and Ira L. Kasindorf, Roslyn, N. Y., assignors to Airborne Instruments Laboratory, Inc., Mineola, N. Y.

Original application May 25, 1948, Serial No. 29,018, now Patent No. 2,556,556, dated June 12, 1951. Divided and this application May 15, 1951, Serial No. 226,514

2 Claims. (Cl. 250—27)

This invention relates to the providing of power for operating balanced loads. More particularly, it relates to the production of a three-line power system having balanced line-to-line impedances from signals provided by a two-line unbalanced system.

This application is a division of application Serial No. 29,018, filed May 25, 1948, now U. S. Patent No. 2,556,556. The parent application describes a telemetering system wherein two voltages derived, for example, from two voltages of a selsyn system, are used to control the side-band frequencies of a carrier wave. With this arrangement, the accuracy of transmission is largely dependent upon the ratio of the side-band frequencies so that absolute frequency standards are not required for either the transmitting or the receiving stations. The three selsyn voltages are reconstructed at the receiving station and thus may be used readily for control operations. A third frequency may be generated corresponding, for example, to the magnitude data portion of the polar information and transmitted simultaneously on the same carrier.

This application relates to apparatus which can be used for reconstructing the third signal so that a selsyn system will operate efficiently and accurately.

Accordingly, it is an object of this invention to provide amplifier apparatus capable of receiving two alternating current signals and producing therefrom, in a balanced network, a third signal whose magnitude is proportional to the difference between these two signals.

It is an object to provide such a system where the tube load is distributed so that maximum power output is obtained from tubes having given power handling capabilities.

The invention accordingly consists in the features of construction, combinations of elements, arrangements of parts and methods of operations as will be exemplified in the structures and sequences and series of steps to be hereinafter indicated and the scope of the application of which will be set forth in the following claims.

In this specification and the accompanying drawings, there is shown and described a preferred embodiment of the invention; but it is to be understood that this is not intended to be exhaustive nor limiting of the invention, but on the contrary is given for purposes of illustration in order that others skilled in the art may fully understand the invention and the principles thereof and the manner of applying it in practical use so that they may modify and adapt it in various forms, each as may be best suited to the conditions of a particular use.

Various aspects, objects and advantages of the invention will be in part apparent from and in part pointed out in the following detailed description of one embodiment of the invention considered in conjunction with the accompanying drawing showing the circuit diagram of amplifier apparatus embodying the invention.

In order to transmit a signal S–1, which is a function of information to be relayed, the three alternating voltages from a 60-cycle selsyn or other system may be used. These voltages may be taken conveniently from a selsyn control system, as for example, one which indicates direction, and which may be generated automatically by a gyro-compass system. It is, however, unnecessary to transmit all three of these voltages because, in the usual selsyn system, the sum of the three voltages is at all times equal to zero. Therefore, knowing the values of any two of the three voltages, the third one can be determined.

These alternating voltages are applied to the input circuit of an amplifier Y (shown in the drawing) which amplifies the two voltages and which produces automatically a third voltage corresponding to the third component of the original signal S–1 and which was not transmitted. This signal may be applied to a servo control motor which may control, for example, the angular position of a turntable of an automatic recording device or to any other desired apparatus.

One of the signals from a source X is applied to grid 492 of triode 494. Anode 496 of this tube is connected through a plate load resistance 498 to high voltage supply lead 502. Cathode 504 of this tube is coupled to ground through a cathode bias resistance 506, which is un-bypassed to provide degenerative feedback. The anode 496 is coupled through a coupling condenser 508 to grid 512 of triode tube 514, the cathode resistance 516 of which is also un-bypassed providing additional negative feedback. The anode 518 of this tube is coupled also to the high voltage lead 502 through a plate load resistance 520 and to the output circuit through a coupling condenser 522.

The signals from a source W are amplified by tubes 524 and 526 in a similar circuit arrangement. Small differences in gain in the inverters and these two stage amplifiers are compensated by adjusting the output of the discriminators, so that equal input signals to the two discriminators produce equal alternating output signals from these amplifiers.

An output circuit having three tubes 528, 532, and 534 is provided to combine the signals delivered by tubes 514 and 526 and to reconstruct the third selsyn voltage. The signal from source X, after amplification by tubes 494 and 514, is coupled by condenser 522 to a control grid 536 of tube 532. The alternating output of source W, after amplification by tubes 524 and tube 526, is coupled to grid 538 of tube 528. Control grid 542 of the third tube 534 is connected to ground through a resistance 544. Cathodes 556, 558, 562, of these tubes are connected together and to ground through an inductance 564.

A feed-back circuit is provided for each of these tubes from the plate to the grid, as for example in connection with tube 532, anode 546 is coupled through capacitor 548 and a variable resistor 552 to the control grid 536. These negative feed-back circuits minimize changes in amplification caused by ageing or replacement of the tubes.

With this arrangement the three selsyn voltages originally present in signal S–1 are applied to the output terminals 566, 568, and 572. One of these voltages is proportional to the input signal voltage delivered by tube 514, a second voltage is proportional to the input signal voltage delivered by tube 526, and a third (developed in the final amplifier stage) is proportional to the voltage difference between these input signals. This latter signal voltage is produced most readily by adjusting the circuits so that equal signal gain is provided by each of the three tubes. This condition will obtain provided the tubes 528, 532, and 534 are substantially identical and the plate load impedances, 574, 576, and 578 have equal impedance values. The effective driving voltage of each of these tubes, i. e. the grid-to-cathode signal voltage, will be the difference between the votage appearing between the respective grid and ground and that developed across the common cathode impedance 564. In the case of tube 534, where no signal is applied directly to the grid, this will be the voltage appearing across the common cathode inductance 564, which produces an opposite effect on the plate current of tube 534 to that produced on the plate currents of tubes 528 and 532 by the signals applied to their respective grids.

The output voltages developed across the load impedances 574, 576, and 578 are proportional to the grid-to-cathode voltages of the respective tubes and are 180 degrees out of phase with respect thereto; the voltage across load impedance 578 being 180 degrees out of phase with some of the instantaneous voltages across impedances 574 and 576.

The output voltage between leads 566 and 572 is equal to the sum of the instantaneous voltages across plate impedance 574 and plate impedance 578, noting that these two plate impedances are connected so that the voltages produced therein by the voltage across the cathode impedance 564 cancel. This voltage is proportional, therefore, to the magnitude of the signal applied to grid 538 of tube 528. In the same manner the voltage appearing between leads 568 and 572 is proportional to the voltage applied to grid 536 of tube 532.

The voltage between leads 566 and 568 is proportional to the algebraic sum of the voltages appearing across plate load inductances 574 and 576. These inductances are connected in opposition so that the output signals produced by the voltage across cathode impedance 564 cancel and the net voltage between leads 566 and 568 is proportional to the difference in voltage between the signals applied to grids 536 and 538 by amplifier tubes 514 and 526, respectively.

These signals, which have the desired relationships, may be applied to the three stator windings of a synchro unit (not shown).

What is claimed is:

1. Electrical apparatus for generating a signal proportional at each instant to the difference in the instantaneous magnitudes of first and second alternating current signals including a first amplifier circuit for said first signal, a second amplifier circuit for said second signals, a third amplifier for producing a signal proportional to the algebraic sum of said first and second signals, means combining said first and second signals to produce a third signal proportional to the sum of said first and second signals, means applying said third signal to said third amplifier and to said first and second amplifiers in opposition to said first and second signals, and output circuit means connected to said first, second and third amplifiers and arranged to deliver three voltages proportional, respectively, to said first and second signals and the difference between said first and second signals.

2. In an amplifier for supplying power to a balanced load, apparatus comprising first, second and third vacuum tubes each having a cathode, an anode, and a control electrode, first and second signal sources, means connecting said first and second signal sources, resectively, to the control electrodes of said first and second tubes, a source of energizing potential having positive and negative terminals, a common cathode impedance element connected between the cathodes of said first and second tubes and the negative terminal of said source, circuit means connecting the voltage developed across said common cathode impedance between the cathode and the control electrode of said third tube, first, second and third anode load impedances connected, respectively, between said positive terminal of said power source and each of said anodes, first, second and third negative feedback circuits connected, respectively, between each of said anodes and the one of said control electrodes associated therewith, and first, second and third output connections connected, respectively, to the anodes of said first, second and third vacuum tubes.

References Cited in the file of this patent

UNITED STATES PATENTS

| Number | Name | Date |
|---|---|---|
| 1,560,505 | Duncan, Jr. | Nov. 3, 1925 |
| 1,797,746 | Young | Mar. 24, 1931 |
| 1,898,366 | Lewis | Feb. 21, 1933 |
| 2,271,876 | Seeley | Feb. 3, 1942 |
| 2,347,458 | Brown | Apr. 25, 1944 |
| 2,466,701 | Hall | Apr. 12, 1949 |
| 2,548,532 | Hedeman, Jr. | Apr. 10, 1951 |
| 2,594,104 | Washburn | Apr. 22, 1952 |